United States Patent [19]

Austen

[11] 3,744,604
[45] July 10, 1973

[54] SYNCHRONOUS DEVICE FOR CHANGE-SPEED GEARS, ESPECIALLY FOR MOTOR VEHICLES

[75] Inventor: Jörg Austen, Weinsberg, Germany

[73] Assignee: Firma Dr.-Ing. h. c. F. Porsche KG, Stuttgart-Zuffenhausen, Germany

[22] Filed: Dec. 21, 1970

[21] Appl. No.: 100,172

[30] Foreign Application Priority Data
Dec. 19, 1969 Germany............... P 19 63 701.5

[52] U.S. Cl............................. 192/53 C, 192/107 M
[51] Int. Cl............................................ F16d 13/00
[58] Field of Search............... 192/107 M, 107 R, 192/107 T, 53 B, 53 C, 53 E

[56] References Cited
UNITED STATES PATENTS

| | | |
|---|---|---|
| 3,152,676 | 10/1964 | Mandlinger et al............. 192/53 C |
| 3,347,347 | 10/1967 | Hetmann...................... 192/107 M |
| 3,200,920 | 8/1965 | Reich............................. 192/53 C |

*Primary Examiner*—Charles J. Myhre
*Assistant Examiner*—Randall Heald
*Attorney*—Craig and Antonelli

[57] ABSTRACT

A synchronous device for change-speed gears, especially for motor vehicles, wherein slotted correcting rings are under the influence of locking members for increasing the servo effect. During the synchronizing operation, the locking or arresting members are brought into pre-tensioned contact onto the correcting rings between sliding or shiftable stops. The inner surface of the correcting rings and/or the surfaces of the locking members operatively cooperating therewith are provided, at least in part, with a friction layer comprising a thin-walled coating of high friction coefficient material such as copper, titanium, molybdenum or the like.

9 Claims, 4 Drawing Figures

3,744,604

Inventor:
JÖRG AUSTEN
BY Craig, Antonelli, Stewart & Hill
ATTORNEYS

SYNCHRONOUS DEVICE FOR CHANGE-SPEED GEARS, ESPECIALLY FOR MOTOR VEHICLES

BACKGROUND OF THE INVENTION

The present invention relates to a synchronous device for change-speed gears, especially for motor vehicles, and more particularly, to a synchronous device in which slotted correcting rings are under the influence of locking bodies which increase the servo action thereof and which, during the synchronous process are brought into pretensioned contact onto the correcting rings between stops.

In a synchronizing device of the aforementioned kind such as shown, for example, in German Pat. 1,038,925, the arresting or locking bodies are constructed as spring steel bands which exert a radial pressure to the inside of the correcting ring during the synchronous operation so that it cannot be over-pressured by the shifting sleeve before synchronization is reached. The arresting or locking force exerted on the correcting ring is dependent upon the shifting force exerted at the shifting sleeve and thereby limits the work effort by the driver.

SUMMARY OF THE INVENTION

It is the aim of the present invention to overcome the problems and disadvantages encountered in the prior art constructions by the improvement of the arresting or locking action during the synchronizing operation.

It is a further aim of the present invention to increase the arresting or locking force of the synchronous device in order to obtain a still shorter shifting time period.

The foregoing problems have been solved in accordance with the present invention by providing a synchronous device, wherein the inner surface of the correcting rings and/or the surfaces of the arresting or locking bodies cooperating therewith are provided, at least over a portion thereof, with a friction layer.

Another advantageous feature of the present invention resides in that the friction layer is formed by a thin-walled coating utilizing a material having a high friction cooefficient such as, for example, titanium, copper, molybdenum or the like.

A further advantageous feature of the present invention resides in that the friction layer between the arresting or locking members and the correcting ring have about the same friction value as the friction surface at the circumference of the correcting rings serving for the synchronizing work.

By employing the small relative movement between the locking or arresting members and the correcting ring during the synchronizing process in accordance with the present invention, the induced shifting force is transformed into a radial arresting or locking force which slidingly holds the surfaces of the locking members and the correcting ring against each other, the larger and more effective the friction connection or contact is of the surfaces of the locking members and the correcting ring. Through the gearing effect thereby created, the radially effective contact pressure of the correcting ring onto the shift sleeve is further increase so that the time for the equalization of the rotative speed and under a shifting force which remains equal is further shortened.

In accordance with the present invention, it has been found that thin-walled coatings, especially of titanium, have been very successful as a friction layer between the contact surfaces. It is to be understood, however, that copper alloys which are applied galvanically or a molybdenum layer applied by the flame-spraying method have also been used with relatively good success. More particularly, favorable synchronizing values with sufficient surface wearing like have been obtained by means of the present invention when the friction layer between the arresting or locking members and the correcting ring have about the same friction coefficient as the friction surface of the circumference of the correcting ring serving for the synchronizing work.

BRIEF DESCRIPTION OF THE DRAWING

These and further aims, features and advantages of the present invention may become more apparent from the following description when taken in conjunction with the accompanying drawing which shows, for purposes of illustration, an embodiment in accordance with the present invention and wherein.

DETAILED DESCRIPTION OF THE DRAWING

Figure 1:
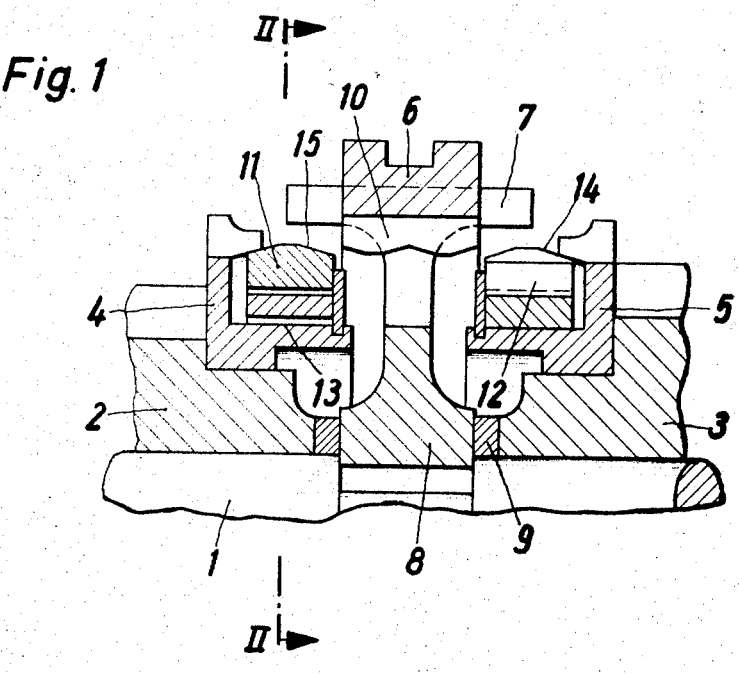
FIG. 1 is a partial cross-sectional, longitudinal view through the synchronous device for the shifting sleeve gear of a motor vehicle including the locking members in accordance with the present invention.

Referring now to the drawing and, in particular, to FIG. 1, there is shown a partial view of the change-speed gear, wherein gears 2 and 3 are freely rotatably arranged on a drive shaft 1 but are not shiftable in a longitudinal direction thereof. The gears 2, 3 are in constant engagement with gears (not shown) on a further gear shaft and are provided with clutch bodies 4, 5, respectively. The clutch bodies 4, 5 are clutchable or engageable with a shifting sleeve 6 which is axially movably held on webs 7 of a shifting sleeve carrier support 8. The shifting sleeve carrier support 8 is solidly connected or keyed on the drive shaft 1 so as not to be freely rotatable and is also fixed axially between the stop disks 9.

Figure 3:
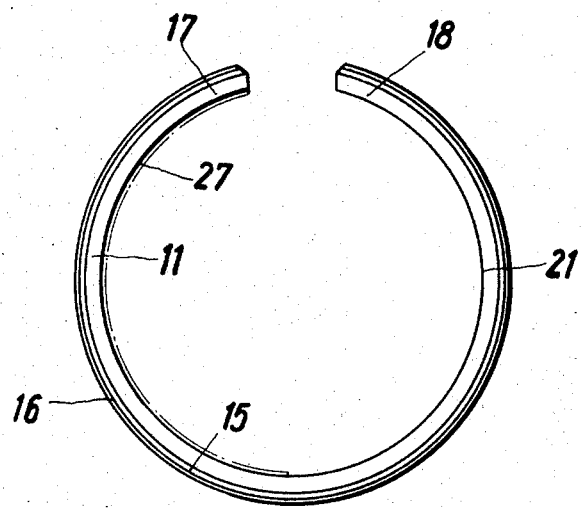
FIG. 3 is an isolated view of the correcting rings of the synchronous device according to FIG. 1.
Figure 4:
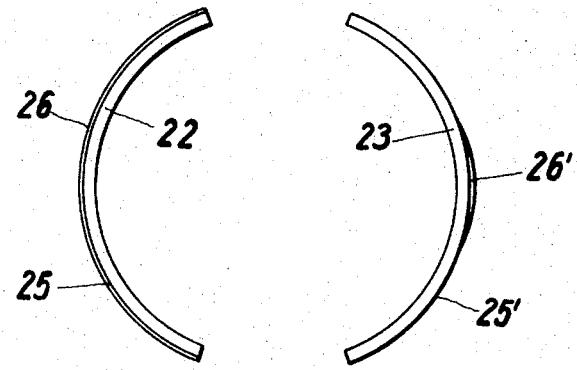
FIG. 4 is a isolated view of the locking or arresting members associated with the correcting ring of FIG. 3.

The head surfaces of teeth 10 of the shifting sleeve 6 operatively cooperate together with correcting rings 11 and 12 of the synchronous device, which correcting rings are arranged on the hub 13 of the clutch bodies 4 and 5 of the gears 2 and 3 which are to be shifted. Each of the correcting rings 11, 12 is provided with a centering surface 14 and a friction surface 15 which have a friction layer 16 of, for example, molybdenum as shown in FIG. 3. A nose 19 of a sliding stop 20 protrudes between the ends 17 and 18 of the correcting ring 11, and the sliding stop 20 is moveably held on the hub 13 of the respective clutch body in a circumferential direction. Locking or arresting members 22 and 23 in the form of bands are arranged between the hub 13 and the inner surface 21 of the correcting ring 11. The ends of the locking or arresting members 22, 23 support themselves on a stop 24 which is held stationary in the hub 13. The surfaces 25, 25' of the arresting or locking bands 22 and 23 as shown in FIG. 4 operatively cooperate with the correcting ring and are provided with a coating 26 of, for example, titanium. The coating is of small thickness and may be applied by a conventional adhesion process, such as, for example, flame spraying. In place of a complete coating on the surface 25, however, a partial coating 26' is also possible as shown on the right half of FIG. 4.

Figure 2:
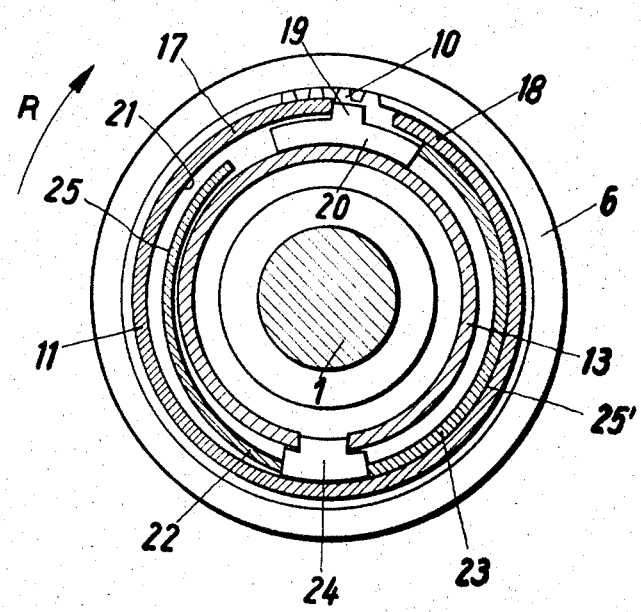
FIG. 2 is a sectional view along line II—II of FIG. 1.

During shifting of a speed and depending on the selection of the shifting direction, the shifting sleeve 6 is axially shifted in relation to the shifting sleeve carrier support 8. If the shifting sleeve 6, as shown in FIG. 1 is moved to the left, the head surfaces of the shifting teeth 10 will become friction-closed with the friction surface 15 of the correcting ring 11, whereby the correcting ring 11 is taken along in the rotational direction R as shown in FIG. 2. By means of the mounting of the end 17 of the correcting ring 11, the sliding stop 20 is pressed in the same direction, so that the tension band and or locking member 23 is tensioned against the stop member 24. During this process, a relative movement between the inner surface 21 of the correcting ring 11 and surface 25' takes place resulting in friction work which is effective on the correcting ring in the form of a spreading force. If, through the friction work between the friction surface 16 and the shifting sleeve, on one hand, and the arresting or locking band and the inner surface of the correcting ring, on the other hand, synchronism is obtained, the synchronous device is relaxed or uncocked. Therefore, the shifting sleeve 6 may be pressed over the correcting ring 11 and brought into engagement with the clutch body 4 so as to complete the shifting process.

While I have shown and described one embodiment in accordance with the present invention, it is to be clearly understood that the same is susceptible of numerous changes and modifications as will be apparent to one skilled in the art. For example, the inner surface of the correcting rings may be provided with a friction coating 27, as shown in FIG. 3 by dot-dashed lines, in leiu of a friction coating on the arresting or locking bands. If need be for large synchronous devices, both surfaces working together can be provided with a friction layer or coating. I, therefore, do not wish to be limited to the details shown and described herein but intend to cover all such changes and modifications as are encompassed by the scope of the present invention.

What is claimed is:

1. Synchronous device arrangement for change-speed gears of the type used on motor vehicles which include a rotating drive shaft and an axially movable shifting sleeve arranged around said drive shaft for selective interengagement with at least one gear positioned around said drive shaft; said arrangement comprising: a slotted correcting ring positioned circumferentially around said drive shaft between said sleeve and said gear, said ring having a radially outwardly facing friction surface for frictionally engaging radially inwardly facing gear teeth provided on said shifting sleeve, locking band means positioned radially inwardly of said ring, said locking band means having radially outwardly facing friction surface means for engaging a radially inwardly facing friction surface provided on said ring, circumferentially movable stop means positioned between the ends of the ring for transferring circumferential movement forces from said ring to said locking band means, and circumferentially fixed stop means positioned on said shaft for limiting circumferential movement of said locking band means, wherein all synchronizing forces resulting from relative circumferential movements between said sleeve and said one gear during the synchronizing process are absorbed by the respective frictional sliding engagement between said radially outwardly facing surface of said ring and said teeth on said sleeve and between said radially inwardly facing surface of said ring and said radially outwardly facing friction surface means of said locking band means, wherein at least one of the two surfaces comprising the radially inwardly facing surface of said ring and the radially outwardly facing surface means of said locking band means is provided with a friction layer for absorbing and transferring away the excessive heat generated during the synchronizing process and for enhancing the frictional engagement of the respective two surfaces, and wherein the friction layer is constructed such that the coefficient of friction for the two surfaces on said ring and locking band means is approximately the same as the coefficient of friction for the surfaces on said ring and said sleeve teeth.

2. A arrangement according to claim 1, wherein the friction layer is a thin-walled coating of high friction coefficient material.

3. An arrangement according to claim 2, wherein the high friction coefficient material is selected from the group consisting of titanium, molybdenum and copper.

4. An arrangement according to claim 1, wherein both of said two surfaces are provided with a friction layer.

5. An arrangement according to claim 4, wherein the friction layer is a thin-walled coating of high friction coefficient material.

6. An arrangement according to claim 5, wherein the high friction coefficient material is selected from the group consisting of titanium, molybdenum and copper.

7. An arrangement according to claim 2, wherein the high friction coefficient material is titanium.

8. An arrangement according to claim 2, wherein the high friction coefficient material is molybdenum.

9. An arrangement according to claim 2, wherein the high friction coefficient material is copper.

* * * * *